United States Patent [19]
Gordon

[11] 3,933,126
[45] Jan. 20, 1976

[54] ANIMAL EXERCISE DEVICE
[76] Inventor: Richard A. Gordon, 95 W. Third St., Freeport, N.Y. 11520
[22] Filed: Nov. 18, 1974
[21] Appl. No.: 524,405

[52] U.S. Cl. .............................................. 119/29
[51] Int. Cl.² ........................................ A01K 29/00
[58] Field of Search ................. 119/29, 17; D30/42; 272/69

[56] References Cited
UNITED STATES PATENTS

| | | | |
|---|---|---|---|
| 1,632,380 | 6/1927 | Marcus | 119/17 |
| 3,057,328 | 10/1962 | Swartz | 119/29 |
| 3,788,277 | 1/1974 | Willinger et al. | 119/29 |

Primary Examiner—Hugh R. Chamblee

[57] ABSTRACT

An animal exercise device is shown. The device consists of a substantially circular hollow housing which is formed with a number of cirfumferentially disposed spaced ribs. There is a substantially centrally disposed opening passing through the housing. A cylindrical hub member passes through the central opening within the housing and has a cut-out portion thereon so that an animal can pass through the hub member into the circular hollow housing. The hub member carries a fastening ring on one side which can be connected to an elongated tube member and a cap is oppositely disposed to said fastening ring.

2 Claims, 5 Drawing Figures

U.S. Patent   Jan. 20, 1976   3,933,126
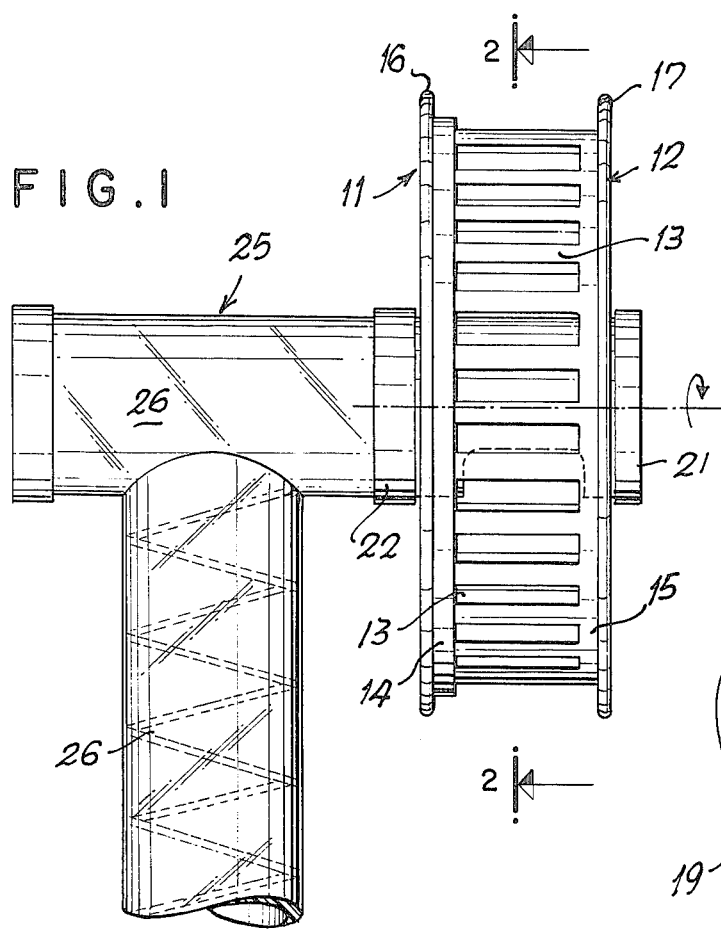
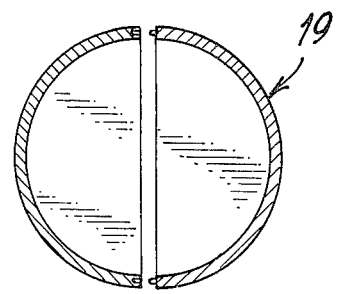
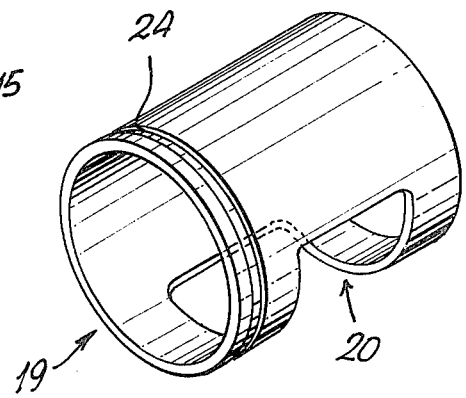
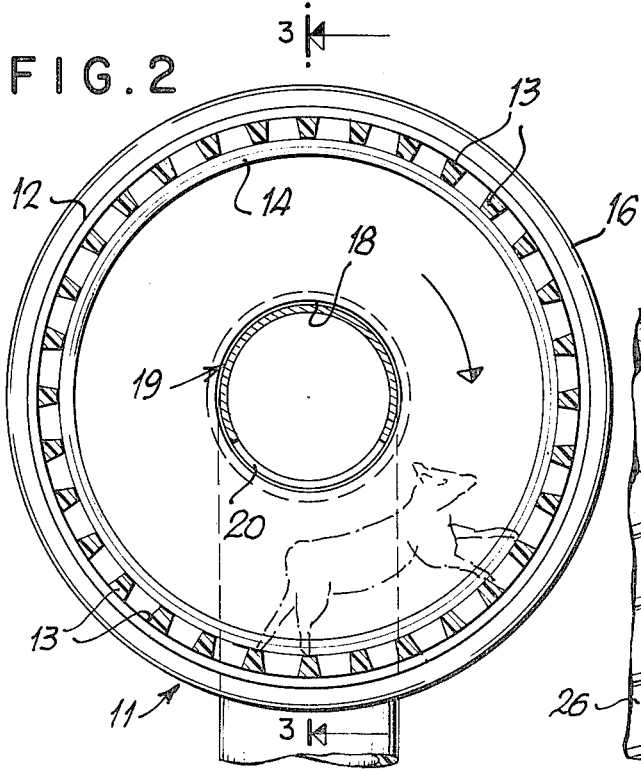
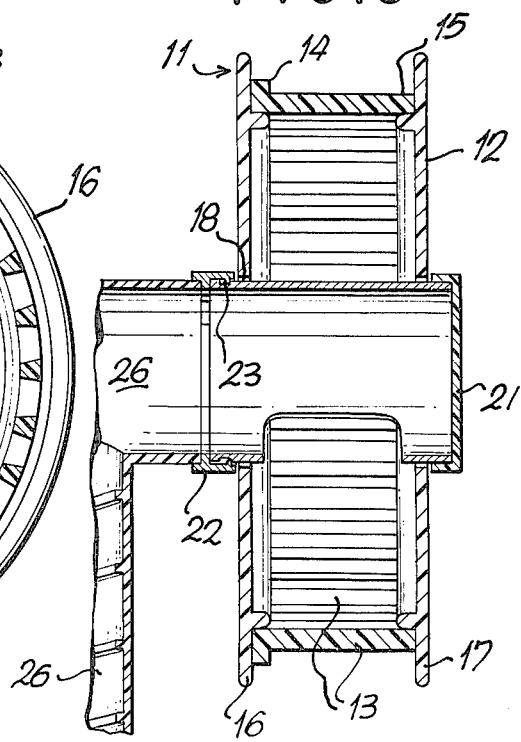

ANIMAL EXERCISE DEVICE

BRIEF DESCRIPTION OF THE INVENTION

The invention can be briefly described as comprising, in combination, a substantially circular rotatable hollow housing, a plurality of circumferentially disposed spaced ribs carried by said housing, the housing being also provided with a substantially circumferential hub opening therewithin. Optionally, but not essentially, a hub member is also provided adapted to fit within the hub opening with the hub member provided with a circumferential cut-out portion thereupon. The hub member is provided with lateral fastening means and oppositely disposed cap member.

DISCUSSION OF THE PRIOR ART

Tube-type animal devices for normal burrowing-type small animals are known. These consist of a plurality of interconnected tubes through which the animal can pass. The provision of an exercise device similar to that of this invention attached to said tube-type devices is believed to be new.

BRIEF DESCRIPTION OF THE DRAWINGS

FIG. 1 is a side perspective view showing the device of this invention attached to a tube-type animal device.

FIG. 2 is a detail cross-sectional view of the device of this invention taken along lines 2—2 of FIG. 1.

FIG. 3 is a cross-sectional view of the form of device shown in FIG. 2 taken along lines 3—3 of FIG. 2.

FIG. 4 is a detail perspective view of the hub member of this invention.

FIG. 5 is a detail cross-sectional view showing fastening means utilized to secure the parts of this invention.

DETAILED DESCRIPTION OF THIS INVENTION

The invention will now be described by reference to the accompanying drawings.

The device 11 of this invention is formed with a substantially circular housing 12 which is hollow and provided with a plurality of circumferentially disposed ribs 13. Ribs 13 are connected by bridge portions 14 and 15 extending on opposite sides of said ribs. A pair of oppositely disposed cover portions 16 and 17 are disposed on opposite sides of said ribs.

Housing 12 is also provided with a substantially centrally disposed opening 18. A hub member 19 normally fits within opening 18 and is provided with a circumferential opening 20 thereupon. A cap 21 is secured on one side of member 19 and a fastening member 22 (FIG. 5) is disposed on the opposite side of member 19. Member 22 has a fastening portion 23 which is carried within a circumferential opening 24 within hub 19.

Member 22 is also secured to an end portion of a tube-type animal device 25 which consists of a plurality of interconnected tubes 26.

With the foregoing specific description the operation of this invention can be explained.

Hub 19 is placed within opening 18 of housing 12 and cap 21 put in position on one side. The opposite side of hub 19 is attached to device 25. A small animal can now travel from tube device 25 through hub 19 into housing 12 and can rotate housing 12 by placing his feet against ribs 13 (FIG. 2). This will rotate housing 12 and provide both exercise to the small animal and entertainment to the viewer.

The foregoing specific embodiments of this invention are for illustrative purposes and for purposes of example only. Various changes and modifications could obviously be made within the spirit and scope of this invention.

I claim:

1. A small animal exercise device comprising, in combination, a substantially circular rotatable housing, a plurality of circumferentially disposed spaced ribs carried by said housing, a substantially centrally disposed hub opening provided within said housing, a hub member adapted to fit within said hub opening, said hub member having lateral fastening means thereupon and being provided with a circumferentially disposed cut-out portion thereupon, and an oppositely laterally disposed cap member carried by said hub member.

2. A small animal exercise device as described in claim 1 said hub member being cylindrical.

* * * * *